United States Patent
Jones et al.

(10) Patent No.: US 7,380,371 B2
(45) Date of Patent: Jun. 3, 2008

(54) CLIP

(76) Inventors: Murray Douglas Jones, 6 Nursery Road, Masterton (NZ); Mark Andrew Jones, 38 Burns Street, Dannevirke (NZ)

( * ) Notice: Subject to any disclaimer, the term of this patent is extended or adjusted under 35 U.S.C. 154(b) by 0 days.

(21) Appl. No.: 10/524,018

(22) PCT Filed: Aug. 8, 2003

(86) PCT No.: PCT/NZ03/00175

§ 371 (c)(1),
(2), (4) Date: Feb. 9, 2005

(87) PCT Pub. No.: WO2004/014126

PCT Pub. Date: Feb. 19, 2004

(65) Prior Publication Data

US 2005/0268545 A1  Dec. 8, 2005

(30) Foreign Application Priority Data

Sep. 8, 2002  (NZ)  ..................... 520531

(51) Int. Cl.
*A01G 17/06*  (2006.01)
*A01G 17/14*  (2006.01)
*B25H 3/04*  (2006.01)
*B65D 33/16*  (2006.01)

(52) U.S. Cl. .............. 47/44; 24/30.5 S; 24/129 B; 24/339; 24/563

(58) Field of Classification Search .......... 47/44, 47/46, 47, 45; 24/30.5 S, 339, 129 B, 563, 24/18, 130, 910, DIG. 28, 335, 336, 343; D8/395, 354, 356, 382

See application file for complete search history.

(56) References Cited

U.S. PATENT DOCUMENTS

| 479,509 | A | * | 7/1892 | Heaphy ................... 24/130 |
| 525,010 | A | * | 8/1894 | Fuller ..................... 47/46 |
| 1,366,212 | A | * | 1/1921 | Pollard ................. 24/129 B |
| 1,687,856 | A | * | 10/1928 | Buchanan-Wollaston ...... 24/18 |
| 2,438,101 | A | * | 3/1948 | Wright ................. 24/129 B |
| D182,259 | S | * | 3/1958 | Tupper .................... D6/315 |
| 4,050,187 | A | * | 9/1977 | Geiger et al. ............ 47/45 |
| 4,355,444 | A | * | 10/1982 | Haney ................. 24/129 B |
| 4,971,282 | A |   | 11/1990 | Dickinson |
| 5,575,446 | A | * | 11/1996 | Swenson et al. ........... 248/304 |
| 5,630,257 | A | * | 5/1997 | Brody et al. ............. 24/300 |
| 6,378,175 | B1 |  | 4/2002 | Vanderpan |
| 6,718,691 | B2 | * | 4/2004 | Taylor ................... 47/44 |
| D494,055 | S | * | 8/2004 | Jones et al. ............. D8/395 |

FOREIGN PATENT DOCUMENTS

| AU | 13536/83 | 10/1983 |
| NL | 7316387 | 6/1975 |
| WO | WO 02/084161 A1 * | 10/2002 |

* cited by examiner

*Primary Examiner*—Andrea M Valenti
(74) *Attorney, Agent, or Firm*—Young & Thompson

(57) ABSTRACT

A clip includes a body (10) and an opening (14) within the body and in which, in use, a part of a plant can engage. A slot (19), which is of doglegged configuration, extends between the opening (14) and an edge (17) of the body (10). The body (10) can be coupled to a means for providing support to the plant or part of the plant by a second opening (13) for which a slot (18) extends from an opposite edge (17) of the body (10).

7 Claims, 4 Drawing Sheets

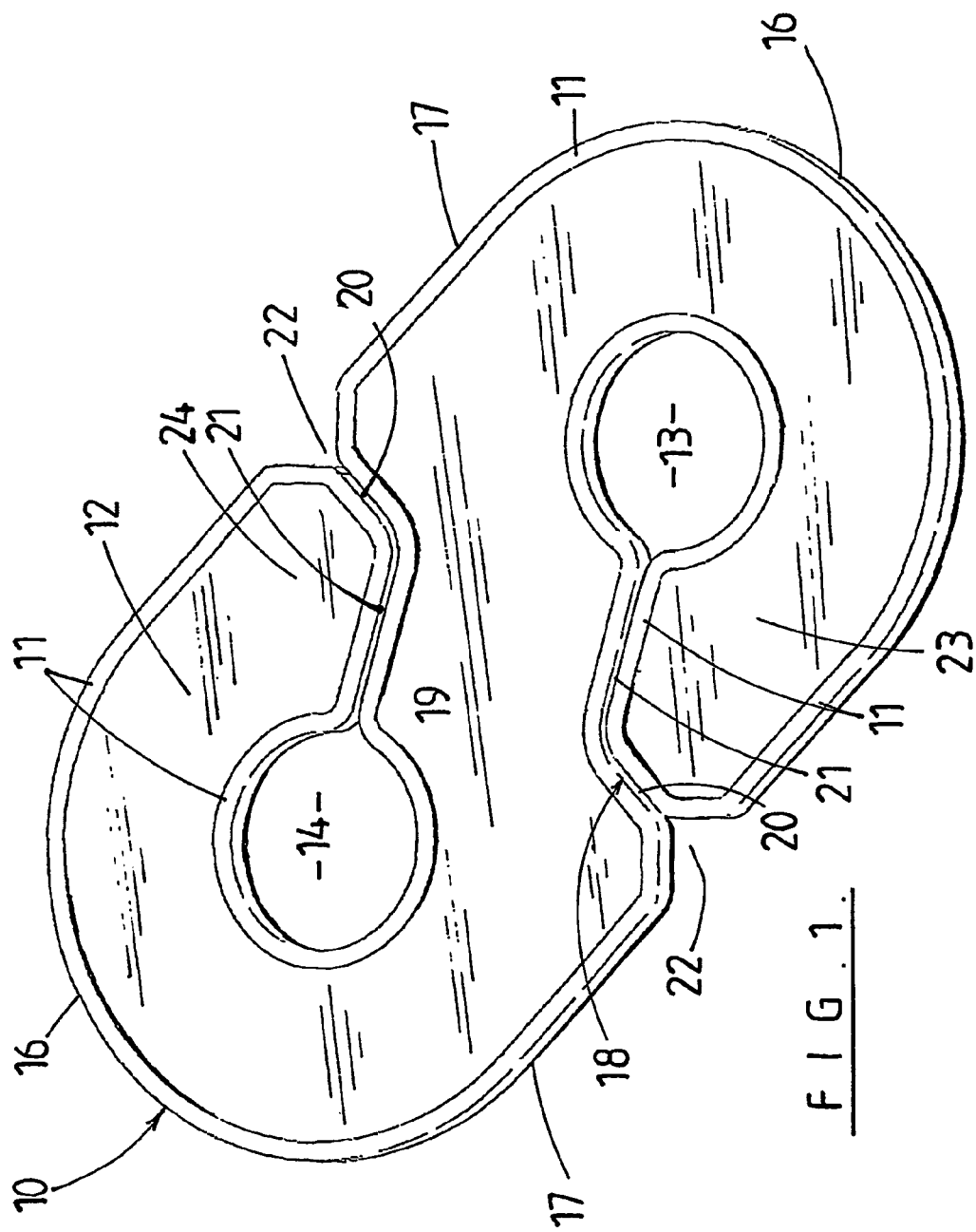

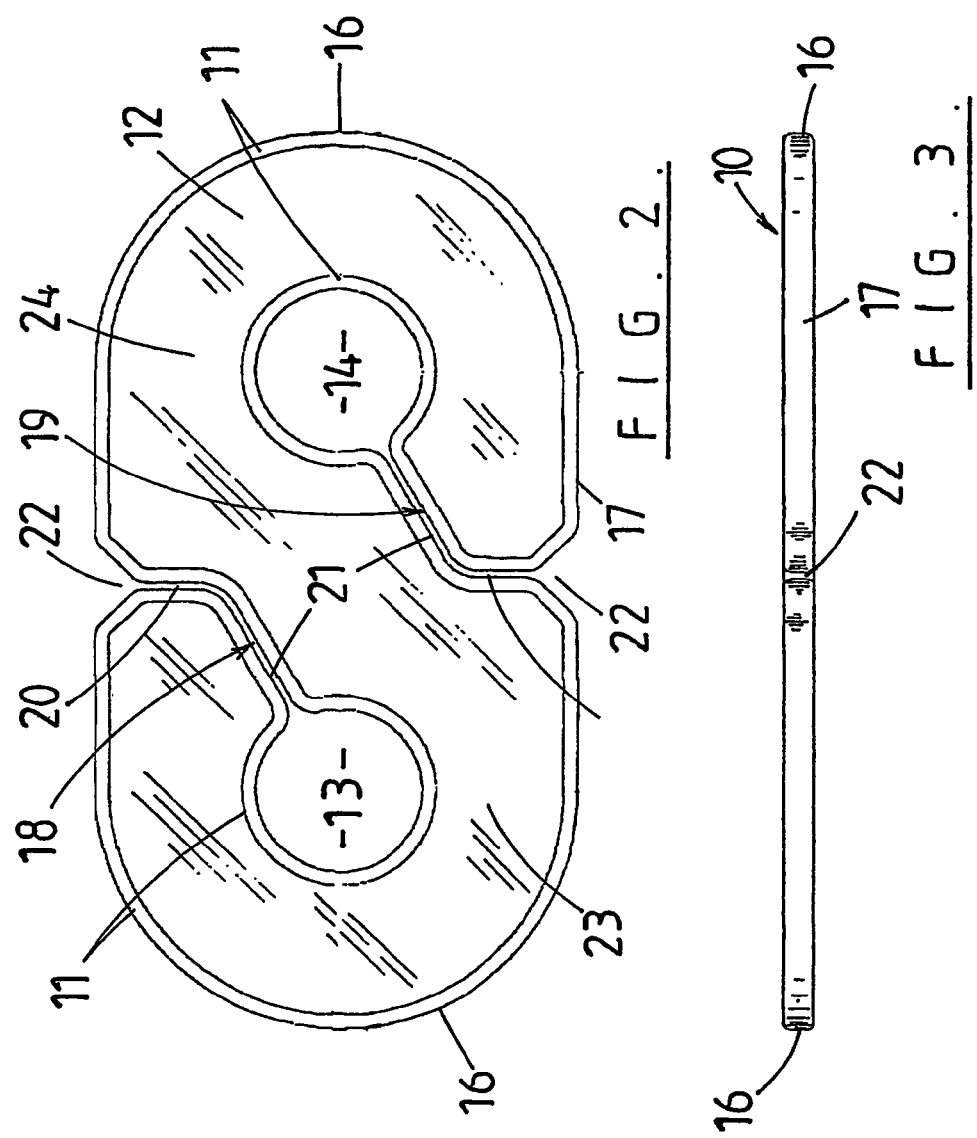

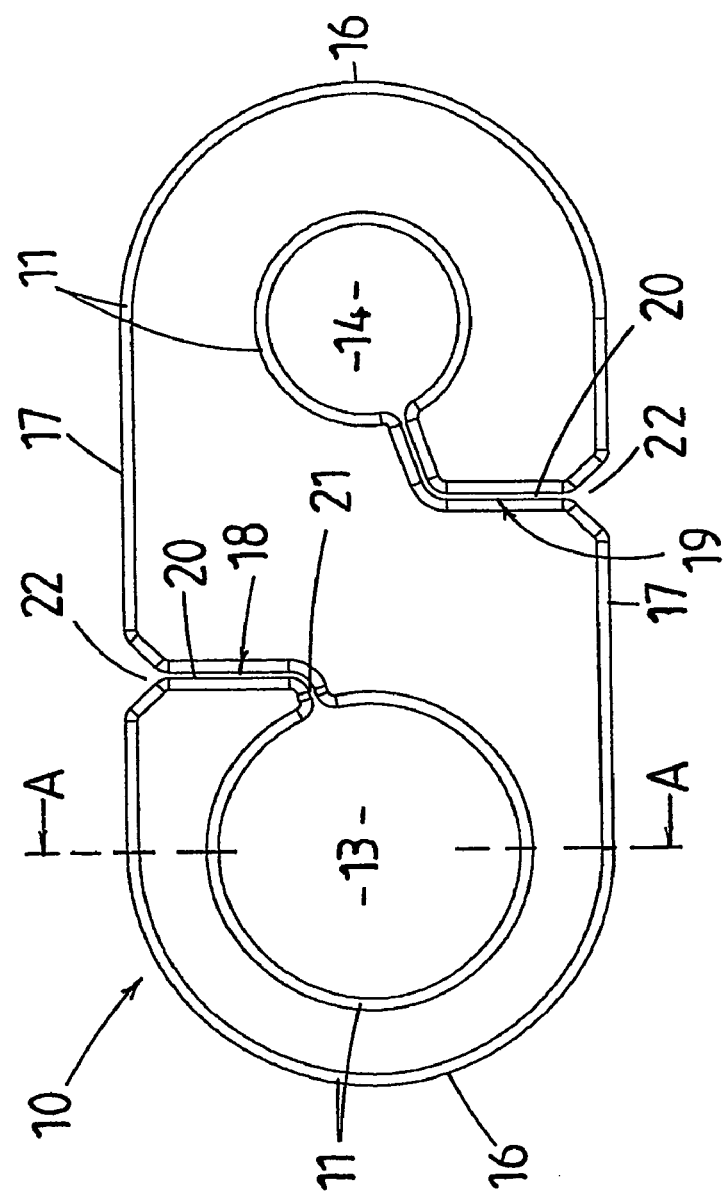
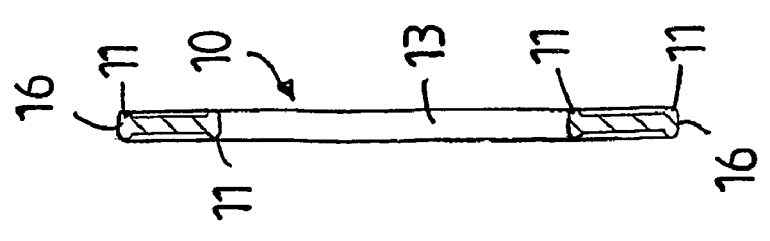

CLIP

BACKGROUND TO THE INVENTION

This invention relates to a clip. More particularly, a clip according to the present invention is intended principally for use in horticulture for clipping growing plants or young trees or parts thereof to a support.

In the following description of the invention, the clip will be described for use in a horticultural application. However, it will apparent that the clip can be used in numerous other applications.

The technique of tying part of a plant or young tree to a support such as a stake is well known. This provides the plant/tree with sufficient support while it grows to a stage where it can be self-supporting or can withstand damage in inclement weather conditions such as strong or high winds.

A known problem with tie devices is that as the plant/tree grows there may not be "give" in the tie to accommodate the increased size of the plant/tree at the point that it is tied. This can result in damage to the plant/tree. For example, a tree can become effectively ring-barked and in extreme cases this will cause the tree to die.

A further problem can arise from the technique needed to place and fix a tie in position. For example, with people having impaired dexterity in fingers or finger joints, it is often difficult to impossible or at least time consuming to tie the tie device about a stake and/or plant/tree. Sometimes such impairment can be temporary e.g. arise due to cold weather conditions or where moisture can render the tie device slippery or difficult to manipulate.

SUMMARY OF THE INVENTION

An object of the present invention is thus to provide a clip which can be used in horticultural work and which is reasonably straightforward to use.

It is a further object of the present invention to provide a clip for use in horticultural work where the clip can accommodate to a certain degree, increasing size of a plant/tree due to growth.

In the following the term plant will be used to broadly include plants, scrubs, bushes and trees.

Broadly according to one aspect of the present invention, there is provided a clip including a body, an opening within the body and in which, in use, a part of a plant can engage, a first slot extending between said opening and an edge of the body and means to enable the body to be coupled to a means for providing support to the plant on part of the plant.

In a preferred form of the invention the coupling means is a second opening within the body and a second slot extending between the second opening and an edge of the body. Preferably, the second slot extends from an edge of the body, which is opposite to that from which the first slot extends.

According to a preferred from of the invention the first slot is of doglegged form. Preferably the second slot is also of doglegged form.

Preferably, the first and seconds slots each have a widened mouth at the edge of the body.

Preferably the body is of moulded plastic construction. The peripheral edge of the body and the edges of the first and second slots and the opening and second opening include a wall which projects from opposite flat sides of the body. Preferably the wall has rounded edges.

In a preferred embodiment the clip is symmetrical about central longitudinal and lateral axes.

BRIEF DESCRIPTION OF THE DRAWINGS

In the following more detailed description of the present invention reference will be made to the accompanying drawings in which:—

FIG. 1 is a perspective view of a preferred embodiment of the clip,

FIG. 2 is a plan view of the clip shown in FIG. 1,

FIG. 3 is an edge view of the clip as shown in FIGS. 1 and 2,

FIG. 4 is a plan view of a clip according to a second embodiment,

FIG. 5 is a cross-sectional view taken on line A-A of FIG. 4, and

DETAILED DESCRIPTION OF THE PREFERRED EMBODIMENTS OF THE INVENTION

Figure 6:
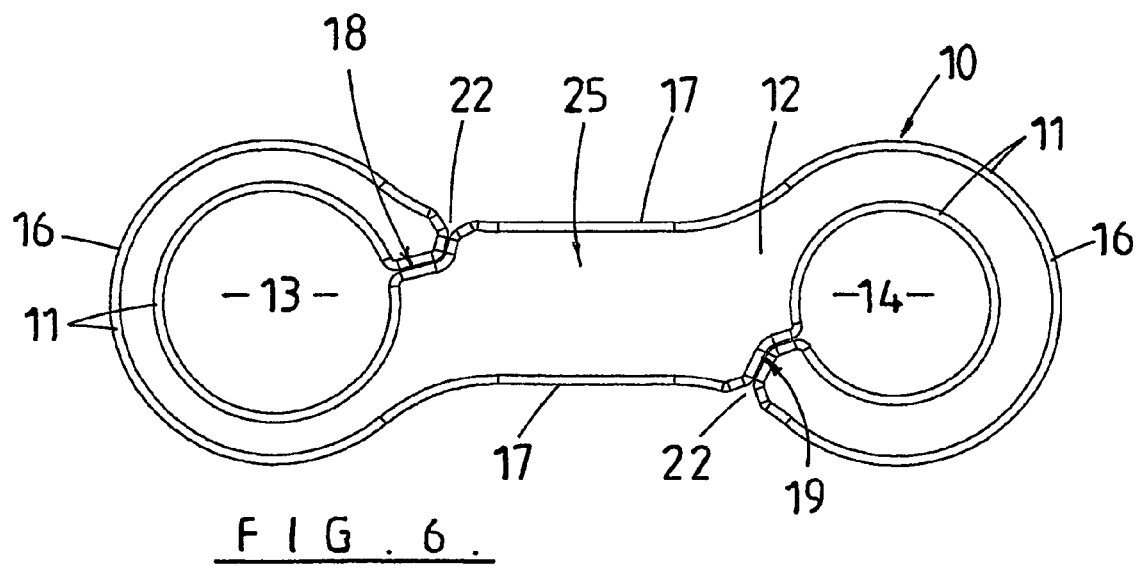
FIG. 6 is a plan view of a third embodiment of the invention.

According to a preferred form of the invention, the clip is of unitary construction and is moulded from a suitable plastic material.

In the form of the invention as illustrated, the clip comprises a body 10, which is of generally flat configuration. Preferably, it has a peripheral edge wall 11, which projects either side of the flat surfaces 12 of the body 10. In the preferred form of the invention the peripheral wall 11 is continuous and it is of a curved or rounded profile, so that in use there is reduced likelihood of an edge of the clip causing damage to the plant.

The body 10 includes two openings 13 and 14. In the preferred form of the invention, these openings 13, and 14 are of the same shape and size. As shown, the openings 13 and 14 are preferably circular and are concentric with curved ends 16 of the body 10. Extending into each of openings 13 and 14 from opposite long sides 17 of the body 10 are respectively slots 18 and 19. As shown, the slots 18 and 19 are preferably of "doglegged" form.

The lead in portion 20 of each of slots 18 and 19, which extends in from the long edge 17 is substantially at right-angles to the long edge and then curves into an inclined portion 21, which opens into the opening 13/14. In the preferred form of the invention, an inwardly converging mouth 22 is formed where the slot 18/19 meets with the long edge 17.

As can be seen from the drawings, the clip is in the preferred form symmetrical about longitudinal and lateral central axes.

In use, the user will apply the clip to a stake by forcing the stake through say slot 18 into opening 13. Because of the degree of flexibility in what is effectively cantilevered portion 23 of the body 10, it is able to flex out of the plane of the body 10. This thereby opens up the slot 18 to permit passage there through of the stake.

In a like manner by bending cantilevered portion 24 adjacent opening 14 out of the plane of clip body 10, a portion of a plant can pass through slots 19 and into opening 14.

Generally, the portion of the plant to be inserted into opening 14 will be of a cross-sectional area which overall is less than that of the opening 14. However, when the plant has grown to a point where the cross-sectional area of the opening 14 is largely taken up by the part of the plant in opening 14, the flexibility of the leg portion 23 will enable this portion to flex out of the plane of the clip body 10. This thereby reduces pressure on the part of the plant in the opening 14. This bending of leg portion 23 will also provide a visual indicator that the clip either needs to be repositioned or removed and replaced by a larger clip.

Because of its construction the clip is easy to use. Without requiring any significant dexterity, a user can simply bring the mouth portion 22 of each slot into contact with the stake or part of the plant, as the case may be. A forcing action can then be used to cause the respective legs 23 and 24 to deflect so as to open up the slots 18 and 19, enabling the passage of the stake and part of the plant to pass through the slot and into the respective openings 13 and 14. The clip can, therefore, be applied quickly.

Because of its compact size and the ability for the clip to be produced economically, a gardener or horticulturalist can carry on his or her person a supply of the clips and have them ready for use as and when required.

The invention is open to modification as will be appreciated by those skilled in the art. For example, in a modified form, the clip may not necessarily have opening 13 and associated slot 18, but rather may have one or a plurality of openings through which fasteners e.g. a staple, nail or the like. so as to fasten the clip to a fixture e.g. post, adjacent the plant.

In a further alternative arrangement, the clip may not necessarily be flat as shown in the drawings, but could be hinged at about mid-point or moulded into a configuration where one part of the clip is located at an angle e.g. right-angle to the other part.

Yet a further alternative arrangement is shown in FIGS. 4 and 5 of the drawings. As can be seen, the slots 18 and 19 are of a different configuration, though essentially "doglegged" while opening 14 is of larger diameter than opening 13. This clip is of a configuration, which is particularly useful as a rose clip. It will be appreciated by those skilled in the art that the difference in diameters of the openings 13 and 14 can differ more markedly than shown in FIG. 4. For example, when the clip is useful in the grape and kiwifruit growing industries, the opening 13 could be of a significantly smaller diameter than opening 14.

A still further alternative embodiment is shown in FIG. 6. Once again, the openings 13 and 14 are of different diameters, but the configuration of the clip is of a so-called "dog bone" configuration by virtue of the body 10 incorporating a waisted portion 25. This particular form of the clip will be useful as a landscape and olive clip.

The clip according to the invention can be used for purposes other than those referred to herein. For example, in the emu and ostrich industry the clip could be used as a leg clip to keep chicks legs from splaying at birth. A leg of the chick would be located in each of the openings 13 and 14.

Other modifications, which will fall within the scope of the present invention, will be apparent to those skilled in the art

The invention claimed is:

1. A clip including
   a body,
   a first opening within the body and a first slot extending between said first opening and an edge of the body,
   a second opening within the body and a second slot extending between the second opening and an edge of the body which is opposite to that from which the first slot extends,
   said first and second slots each being of doglegged form and which extends from a widened mouth at the edge of the body,
   said clip being symmetrical about a central longitudinal axis, wherein,
   each mouth is separate from said doglegged form,
   each of said first opening and said second opening is wider in cross-section than a cross-sectional width of the corresponding first slot and the corresponding second slot,
   the first doglegged slot has a first portion which extends at an angle to the edge of the body and a second portion which inclines away from the first portion and extends to the first opening, and
   the first portion of the first doglegged slot extends at right angles to the edge of the body.

2. A clip as claimed in claim 1 wherein each opening is circular in shape.

3. A clip as claimed in claim 2 wherein the diameter of one of said first and second openings is greater than the diameter of the other of said first and second openings.

4. A clip as claimed in claim 1, wherein the second portion of the first doglegged slot extends diametrically relative to the first opening.

5. A clip as claimed in claim 1, wherein a peripheral edge of the body and the edges of the first and second slots and first and second openings include a wall which projects from opposite flat sides of the body.

6. A clip including
   a body,
   a first opening within the body and a first slot extending between said first opening and an edge of the body,
   a second opening within the body and a second slot extending between the second opening and an edge of the body which is opposite to that from which the first slot extends,
   said first and second slots each being of doglegged form and which extends from a widened mouth at the edge of the body,
   said clip being symmetrical about a central longitudinal axis, wherein,
   each mouth is separate from said doglegged form,
   each of said first opening and said second opening is wider in cross-section than a cross-sectional width of the corresponding first slot and the corresponding second slot, wherein,
   the first and second doglegged slots each has a first portion which extends at an angle to the edge of the body, the first slot further has a second portion which inclines away from the first portion and extends to the first opening within the body and the second slot further has a second portion which inclines away from the first portion and extends to the second opening within the body, and
   the first portion of each of the first and second slots extends at right angles to the edge of the body.

7. A clip as claimed in claim 6 wherein the second portion of the first slot extends diametrically from the first opening and the second portion of the second slot extends diametrically from the second opening.

* * * * *